United States Patent [19]

Huft et al.

[11] Patent Number: 4,577,064
[45] Date of Patent: Mar. 18, 1986

[54] AUTO-BALANCE CIRCUIT FOR BATTERY FEED IN A TELEPHONE CIRCUIT

[75] Inventors: John M. Huft, Lakewood; Frederick J. Kiko, Aurora, both of Colo.

[73] Assignee: GTE Lenkurt Incorporated, Phoenix, Ariz.

[21] Appl. No.: 764,518

[22] Filed: Aug. 12, 1985

Related U.S. Application Data

[63] Continuation of Ser. No. 489,998, Apr. 29, 1983, abandoned.

[51] Int. Cl.⁴ ............................................. H04M 19/00
[52] U.S. Cl. ...................................... 179/16 F; 179/77
[58] Field of Search ................. 179/16 F, 18 FA, 70, 179/77, 81 R, 170 NC, 16 AA; 330/103, 260

[56] References Cited

U.S. PATENT DOCUMENTS

| 3,916,110 | 10/1975 | Lee et al. | 179/16 F |
|---|---|---|---|
| 4,007,335 | 2/1977 | Hetherington et al. | 179/16 AA |
| 4,283,604 | 8/1981 | Chambers, Jr. | 179/18 FA |
| 4,315,106 | 2/1982 | Chea, Jr. | 179/16 F |
| 4,345,117 | 8/1982 | Sweet | 179/77 |
| 4,387,273 | 6/1983 | Chea, Jr. | 179/16 F |
| 4,419,542 | 12/1983 | Embree et al. | 179/77 |
| 4,467,350 | 10/1984 | Aull et al. | 179/70 |
| 4,514,595 | 4/1985 | Rosenbaum et al. | 179/16 F |

FOREIGN PATENT DOCUMENTS 2065418 6/1981 United Kingdom ................. 179/77

Primary Examiner—Gene Z. Rubinson
Assistant Examiner—R. Vaas
Attorney, Agent, or Firm—Russell M. Cannon

[57] ABSTRACT

An active current limited in only the ring side of a telephone circuit has the control branch of a current mirror resistively connected across a supply voltage for establishing the magnitude of loop current in its other branch. A first resistor is also connected between adjacent one sides of the two branches for causing the control voltage and loop current to vary as a function of loop length. Extraneous metallic voltages on the A and B leads are AC coupled to associated inputs of a differential amplifier having its output connected through a second resistor to the one side of the control branch for modulating the loop current provided by the other branch. Opposite sides of the second resistor are fed back to associated input terminals of the amplifier. The amplitude modulated loop current is also fed back to an input of the amplifier for minimizing the affects of induced metallic voltages on the tip and ring lines.

8 Claims, 2 Drawing Figures

AUTO-BALANCE CIRCUIT FOR BATTERY FEED IN A TELEPHONE CIRCUIT

CROSS-REFERENCE TO RELATED APPLICATION

This is a continuation of application Ser. No. 489,998, now abandoned, filed Apr. 29, 1983.

BACKGROUND DESCRIPTION

This invention relates to a circuit providing battery feed to a subscriber loop in a telephone circuit and more particularly to current limit means for adjusting the amplitude of current supplied to a subscriber loop as a function of loop resistance (i.e., loop length) and to longitudinal balance means for minimizing the effect of extraneous longitudinal AC voltages induced in the loop.

In many battery feed circuits for a telephone subscriber station, considerable power is dissipated in current limiting resistors which are employed to limit the maximum current amplitude. In particular, a foreign exchange battery feed circuit is a notorious power sink, especially on short loops. As is well known, a current limiting resistor is normally employed in each leg of the power feed circuit in order to maintain the longitudinal balance of each leg with respect to ground. The value of each of these resistors is in the order of 200 ohms so that a 200 ohm telephone set that is connected on a short loop will provide an off-hook current of 80 milliamperes from a standard −48 volt battery supply. The power dissipated in the 200 ohm battery feed resistors and given off as heat is then 2.5 watts. This is not only a waste of energy, but the heat that is generated may adversely affect associated microelectronic circuits currently employed in the telephone plant. It is desirable therefore to provide a current limit circuit which will control the amplitude of current supplied to a subscriber telephone station with a minimum of heat loss. Further, it is desirable to accomplish this result and at the same time maintain the longitudinal balance of the subscriber loop. It is also desirable to correct for any imbalance caused by the introduction of an active current loop means in only one lead of the subscriber loop and for the battery boost option in the other lead.

SUMMARY OF THE INVENTION

In a telephone system, apparatus for controlling DC current supplied from a central office battery to a subscriber telephone station via a subscriber loop circuit and for minimizing extraneous AC induced metallic longitudinal voltages appearing thereon includes: a bias circuit arrangement for establishing a DC reference voltage at a reference node; differential circuit means comprising a differential amplifier connected across the lines and operative for detecting any AC induced longitudinal metallic voltage on the lines, converting this AC voltage to an AC output current of the differential means, and superimposing the AC output current on said DC reference voltage at the reference node; first means responsive to said AC current and DC reference voltage at the reference node for varying the amplitudes of both the DC current from and output voltage of the first means in accordance with the AC current at the reference node; and feedback means for coupling the amplitude variation in the output voltage of the first means to an input of said differential amplifier whereby induced metallic AC voltages are minimized.

DETAILED DESCRIPTION OF PREFERRED EMBODIMENTS

Figure 1:
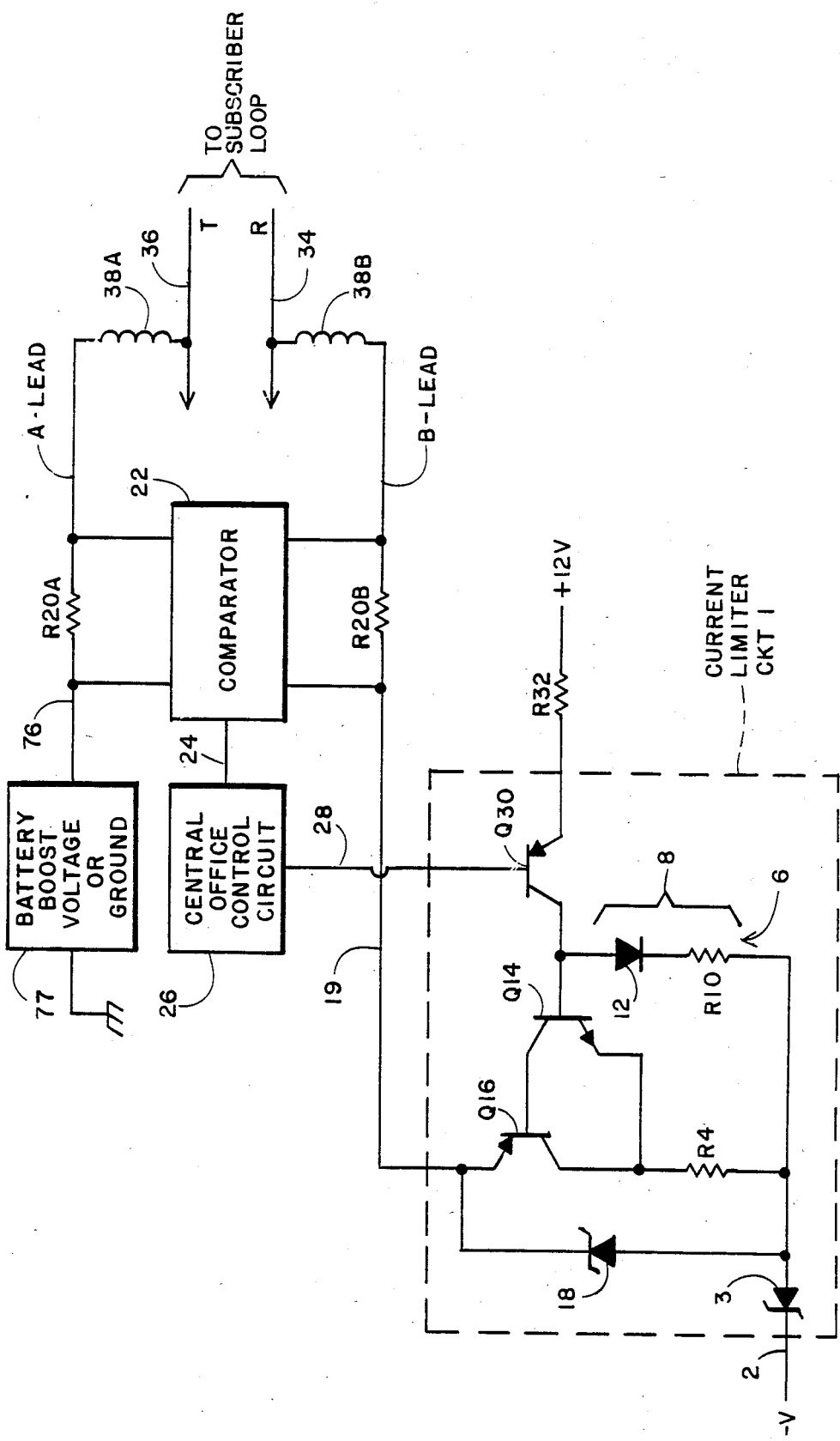
FIG. 1 is a schematic circuit diagram of a current limiter circuit 1 in the environment of a central office for providing a fixed subscriber loop current.

Referring now to FIG. 1, the current limiter circuit 1 which supplies a fixed current to a subscriber loop is illustrated generally within the environment of a telephone central office. Central office battery voltage is illustrated between −V and ground, and is usually in the order of −40 volts, although it may vary from 21 to 56 volts. This voltage is applied on input path 2 to the current limiter circuit 1. When the subscriber handset (not shown) is off-hook so that current is supplied by the central office battery, the main path for the power feed circuit is along line 2, through isolation diode 3, the resistor R4 in one leg of a current mirror circuit 6, the collector-emitter path of power transistor Q16, current sensing resistor R20B, retard coil 38B, ring lead 34, the subscriber telephone station unit (not shown), and returning to tip lead 36 and retard coil 38A to either ground or a +50 volts which is provided by circuit 77 for extending the length of a loop on which this circuit will operate. This creates a problem of different impedances to ground, however, since a +50 volt battery boost provided by circuit 77 presents a non-zero (50 ohm) impedance with respect to ground as opposed to zero ohms when line 76 is grounded. This difference in impedance will normally throw the feed circuit out of balance. As described hereinafter, this invention compensates for such a change or imbalance of input impedances to ground. As is well known, the battery power feed circuit is connected with the positive terminal of the central office battery grounded. In order to isolate the voice path from ground, retard coils 38A and 38B are employed for passing the battery feed current but essentially isolating the voice frequency path from ground.

A central office control circuit is indicated at 26 and such arrangements are well known so the different functions provided thereby are not discussed in detail here. In foreign exchange office (FXO) applications, circuit 26 produces a signal on line 28 which cuts off Q30 for removing base drive for Q14 and thus power transistor 16 and thereby disabling the current limiter circuit 1. In foreign exchange station (FXS) applications, however, the control signal on line 28 turns Q30 on for biasing Q14 and Q16 so they conduct from the +12 volt supply potential through R32 and R4 to −V. In this manner, the DC circuit is always on for maintaining the battery feed circuit ready to supply current to the subscriber telephone station when a subscriber demands it by placing his telephone station handset in an off-hook condition.

With the subscriber handset off-hook, line current flows in opposite directions through battery feed or current sensing resistors R20A and R20B which impress a differential voltage on comparator 22. The 68 ohm sense resistors R20A and R20B have previously had to be one-half percent resistors in order to obtain precise balance in the tip and ring lines, but they may be 5% resistors where a differential comparator 22 and auto-balance circuit 50 are employed in FIG. 2 to compensate for slightly different values thereof in accordance with this invention. The comparator 22 is responsive to the sensed signals for producing an output signal on line 24 which causes the central office control circuit 26 to accomplish prescribed functions.

The aforementioned conduction of switching transistor Q30 applies a constant DC current to the control branch 8 of the current mirror circuit 6. The diode 12 is included in this control branch for matching the voltage drop provided by the base-emitter junction of Q14. Thus, the voltage developed across R10 essentially sets the voltage drop across R4, and hence the current flowing in that path. Because of the action of the current mirror circuit 6, the value of R4 can be selected so as to provide a constant loop current to the subscriber loop regardless of the subscriber loop length. For example, the amplitude of current may be set at 23 milliamperes, which current will essentially be independent of loop length. This provides power savings and has merit in some applications. In applications utilizing a touch-tone station handset, however, this can cause problems when the telephone set is operated on a short loop. In essence, the use of a constant current, which is independent of loop length, fools the telephone set into thinking it is on a longer loop. The touch-tone telephone station set then increases the output level of the voice circuit and the output level of the tone for the dual tone multi-frequency (DTMF) circuit. A modified current limited circuit which ameliorates this problem is shown in FIG. 2.

Figure 2:
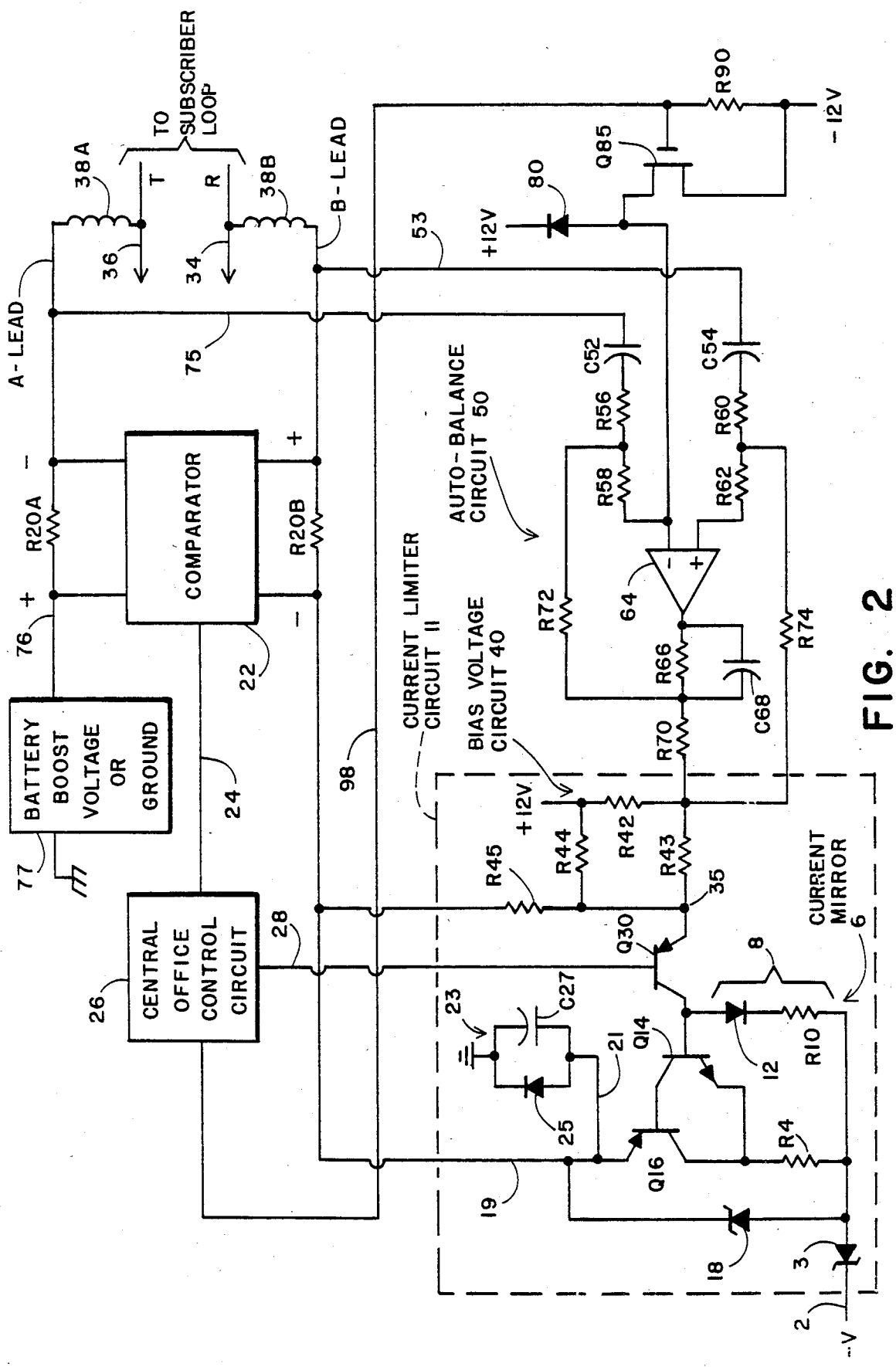
FIG. 2 is a schematic circuit diagram of an embodiment of this invention.

Referring now to FIG. 2, it will be noted that the elements which perform the same functions as those equivalent in FIG. 1 are given the same identification numerals and will not be further described here. There are two major differences between the circuits of FIG. 1 and FIG. 2. First, the circuit of FIG. 2 uses an adjustable bias voltage circuit arrangement 40 which is made up of R42, R43, R44 and R45, ones of which are connected together at node 35 and others of which are electrically connected to the +12 volt bias voltage. And second, the circuit of FIG. 2 includes an autobalancing circuit 50 which is essentially bridged across the A and B leads of the subscriber loop. In this circuit of FIG. 2, the output of control circuit 26 on line 28 maintains Q30 conducting in an FXS application for turning on Q14 and Q16 which operate with the current mirror and bias circuit 40 as a constant current source. And the output of the control circuit 26 on line 98 holds FET switch R85 on or conducting for pulling the inverting input of amplifier 64 to −12 volts for disabling the amplifier until a differential current in the telephone lines 36 and 34 is sensed across R20A and R20B by the comparator 22, which indicates that the subscriber handset (not shown) is off-hook and that there is an imbalance in the tip and ring circuits. Thus, there is no AC current modulation in R70 until R85 is cut off.

The current limiter circuit 11 here operates in a manner similar to circuit 1 for providing a DC reference voltage on line 19 which is essentially modulated by the operation of circuit 50. In this circuit, a 400 volt diode 25 is employed to clamp a positive voltage from a lightening hit to ground for protecting Q14 and Q16. The capacitor C27 is useful in stabilizing the circuit, slowing its response slightly for preventing oscillation.

Referring now to the auto-balancing circuit 50, capacitors C52 and C54 provide DC isolation for the operational amplifier 64 while passing extraneous AC signal voltages appearing on the tip and ring lines. As is well understood in the art, AC voltages are commonly introduced into the telephone circuits from different sources, a principal one being power lines that are attached to cross arms of a telephone pole. The resultant induced currents and longitudinal imbalances in the circuit can create metallic currents which can be transmitted through the telephone set and be disturbing to the subscriber.

The inverting input of operational amplifier 64 is electrically connected to the tip lead 36 via retard coil 38A, C52, R56 and R58. The non-inverting input of the amplifier is connected to the ring lead 34 via the retard coil 38B, C54, R60 and R62. Amplifier 64 is a basic operational amplifier which is arranged to convert and amplify voltage to current. This is accomplished by the use of output current flowing through R70, the differential of which is fed back via R72 and R58 to the inverting input of the amplifier at one side and via R74 and R62 to the non-inverting input of the amplifier. The two feedback resistors R72 and R74 are large compared to R70 so that the circuit has a high gain. In contrast, the input resistors R56, R58 and R60, R62 to the inverting and non-inverting inputs of the amplifier are quite small for essentially multiplying the effects of C52 and C54 for providing an AC short circuit between said inverting and non-inverting leads and the associated A and B leads, effectively lowering the Q of C52 and C54, and for protecting the amplifier from the effects of lighting. This operates in conjunction with the retard coils as a filter for rejecting extraneous AC signals on the telephone lines 34 and 36. The use of this operational amplifier provides a gain which, in conjunction with the gain of the current mirror circuit 6 and a feedback path (consisting of line 19, R20B and line 53 to C54) that is electrically coupled to the non-inverting input of the amplifier, provides a negative feedback which also acts to cancel out extraneous AC signals. And at the output of the amplifier, a resistor 66 (which has a value in the order of 100 K ohms) is shunted by C68. Since this occurs before there is any feedback effect, a frequency dependent current output, for an AC input signal to the amplifier, may be obtained. The reason such a frequency dependent current output is desirable is that a higher drive is wanted at high frequencies. Further, it is desirable that this circuit not be responsive to the 10 Hz dial pulsing rate or it would tend to null out such pulsing. On the other hand, it is desirable to have to circuit work effectively at 60 Hz, since that is the frequency at which the major portion of the extraneous AC voltages are induced into the subscriber circuit. The AC output current of circuit 50 and the DC reference voltage are summed at node 35 and amplified by the current mirror and transistors Q14 and Q16, and modulate the voltage on line 19 and the current output there of the current source for nulling out any metallic voltage on the telephone lines and thereby cancelling the effects of longitudinal imbalance.

In FIG. 1, the bias voltage of +12 volts was shown as being connected to the emitter of transistor 30 via a single resistor R32. In FIG. 2, R32 is essentially replaced by R42 and R43 which provide the desired DC bias at the inputs of amplifier 64 through differential resistor R70, and R72 and R74. They also provide an appropriate series resistance that is in parallel with R44. The currents in R44, R42 and R43, and R45 are summed at node 35 where a voltage reference is set which establishes a reference voltage on line 19. The resistances of R42, R43 and R44 are selected so that for only the current limiter portion of the circuit, the current mirror 6 and transistors operate to provide a constant current of 50 milliamperes on line 2. In this circuit, no matter how much resistance there is between line 19 and ground, as determined by the loop, this current source will set up enough voltage on line 19 to let a specified amount of current flow that it is set at. An undesirable affect of supplying a constant current of 50 milliamperes, however, may be loss of longitudinal balance on loops which are longer than 900 ohms since the auto-balance circuit 50 operates by modulation of the current limit value. This deficiency is overcome by the output of the amplifier varying the current flowing in the control branch 8 of the current mirror circuit 6. Resistor R45 is connected between the emitters of Q16 and Q30 and thus has a voltage across it that is proportional to the loop length. Thus, R45 essentially operates to subtract from the control current in branch 8 an amount that is proportional to the loop length. In this way, satisfactory operation of this circuit with a touch-tone type telephone set using dual tone multifrequency signalling may be obtained. Further, the auto-balance circuit is then not limited to the 900 ohm length, but functions to a loop length of 1700 ohms, which is the traditional range for a 48 volt office battery supply. An embodiment of this invention in FIG. 2 that was built and satisfactorily operated produced a line current of 45 milliamperes on a short loop (200 ohms) and 23 milliamperes on a long loop (1700 ohms). On the short loop, the tip and ring leads were connected directly to the telephone set (i.e., the physical length of the loop was zero).

What is claimed is:

1. Apparatus for controlling direct current supplied from an office battery to a subscriber telephone station via tip and ring lines of a subscriber loop circuit and minimizing extraneous AC induced longitudinal voltage appearing thereon comprising:
    bias means for establishing a DC reference voltage at a reference node;
    differential means for detecting any AC induced longitudinal voltage on the lines, converting this AC voltage to an AC output current of said differential means, and superimposing said AC output current on said DC reference voltage at said reference node; said differential means comprising a differential input operational amplifier having inverting and non-inverting terminals electrically connected to one and other of the lines, respectively;
    first means responsive to said AC current and DC reference voltage at said reference node for varying the amplitudes of both a DC output current from and an output voltage of said first means in accordance with said AC current at said reference node; and
    first feedback means for coupling the amplitude variation on the output voltage of said first means to an input of said differential amplifier whereby the affect of any longitudinally induced AC voltage is minimized.

2. Apparatus according to claim 1 wherein said differential means further comprises first and second AC coupling capacitors in the electrical connections of the inverting and non-inverting input terminals to the one and other lines, respectively.

3. Apparatus according to claim 2 wherein said differential means further comprises first resistor means in series in the electrical connection of an output terminal of said amplifier to said reference node and second and third feedback means for coupling one and other sides of said first resistor means to inverting and non-inverting input terminals, respectively of said amplifier.

4. Apparatus according to claim 3 wherein said second and third feedback means comprise associated second and third resistor means having resistances that are much greater than that of said first resistor means.

5. Apparatus according to claim 4 wherein said differential means further comprises fourth resistor means in series in the electrical connection of the output of said amplifier means to said first resistor means, said fourth resistor means having a resistance that is much greater than that of said first resistor means and much less than that of said second and third resistor means.

6. Apparatus according to claim 5 wherein said differential means further comprises a third capacitor electrically connected in parallel with said fourth resistor means, whereby said third capacitor and fourth resistor means operate as a filter means for blocking selected low frequency signals in the output of said amplifier, which frequencies are less than the frequency of 60 cycle signals on power lines.

7. Apparatus according to claim 6 wherein said second and third feedback means comprise first and second pairs of series connected input resistors in the electrical connection of said inverting and non-inverting input terminals to said first and second capacitors, respectively; said second and third resistor means being connected to the junction of the said first and second pairs of input resistors, respectively.

8. Apparatus according to claim 7 further comprising fourth feedback means electrically connecting said reference node to the side of said second capacitor that is spaced away from the non-inverting input terminal.

* * * * *